UNITED STATES PATENT OFFICE.

HEINRICH CARL BUER, OF BONN, GERMANY.

PROCESS OF PRODUCING LECITHIN.

1,019,945.  Specification of Letters Patent.  Patented Mar. 12, 1912.

No Drawing.  Application filed September 16, 1909.  Serial No. 518,030.

*To all whom it may concern:*

Be it known that I, HEINRICH CARL BUER, doctor of philosophy, a subject of the German Emperor, residing at 31 Koenigstrasse, Bonn, Germany, have invented a Process for Producing Lecithin, of which the following is a specification.

When seeds of leguminous plants are boiled for several hours with hot 96% alcohol, an extract is obtained which consists of bitter ingredients (alkaloids), fat, and various albuminous substances and lecithin. The inventor of the present process has previously elaborated two other processes (described in my co-pending applications Nos. 437871 and 483784) which are devised to obtain lecithin from the extract produced by boiling with alcohol. After further experiments, the inventor has now devised a materially improved and perfected method for obtaining the lecithin. This new process is essentially as follows.

The seeds of the leguminous plants are boiled for at least six hours with 96% alcohol under a reflux condenser. In this way there is obtained an extract of much greater concentration than when the said seeds are only boiled with alcohol for two or three hours. From the extract obtained after boiling for six hours, the lecithin is then obtained in the following manner. The extract is first evaporated down without the addition of water by about 10%. This extract is then allowed to stand about 12 hours, in which time a precipitate, which is comparatively rich in lecithin separates therefrom. The supernatant solution is then decanted and evaporated down by about 20% of its volume; and, after standing about 12 hours, a second precipitate rich in lecithin is obtained, and a second supernatant solution is decanted and evaporated by 20% of its volume, and allowed to stand 12 hours, whereby a third precipitate large in lecithin is obtained. By this method of procedure, a much better yield and a purer lecithin is obtained than when the extract is first diluted with water and then immediately concentrated to the consistence of treacle, that is to say, concentrated at once by 40 to 50%. If the extract is greatly concentrated at once, then not only does the lecithin separate but also fat and various albuminoids; the latter bodies pass into solution in not inconsiderable quantities on prolonged boiling of leguminous seeds with the alcoholic alkaloid solution through the action of the latter. Consequently the lecithin so obtained is not only impure by reason of the fat, but also by the presence of albumen. From this it results that only a very much smaller quantity of lecithin is separated out of the extract. If, on the other hand, the extract be evaporated in the manner above set forth by repeated operations and only by a small percentage at once, the lecithin is precipitated in double quantity and also is much more pure than when the extract is immediately evaporated to a great extent at once.

For boiling the leguminous seeds, use is made of from 50 to 75 liters of 96% alcohol for each hundredweight of raw material. There is obtained according to the quality of the raw material one to two pounds of lecithin from a hundredweight of leguminous seeds.

What I claim is:

1. The process for obtaining lecithin from seeds of leguminous plants which consists in the prolonged boiling of the said seeds in 96% alcohol, then repeatedly concentrating the extract, causing the lecithin to precipitate after each concentration; separating the supernatant solution from each precipitate, and finally treating the precipitates for a short period with boiling alcohol, separating the solution containing the lecithin from the fatty residue and finally evaporating off the alcohol.

2. The process of obtaining lecithin which consists, first, in obtaining an extract from the seeds of leguminous plants by boiling the seeds in alcohol; second, concentrating the extract by about 10% of its original volume and thereafter allowing a solution comparatively rich in lecithin to precipitate; third, decanting the supernatant liquid from the precipitate solution and concentrating the same by about 20% of its volume and again allowing a solution which is comparatively rich in lecithin to precipitate; fourth, decanting the supernatant liquid from the precipitate solution and concentrating this decanted liquid by about 20% of its volume and again allowing a lecithin solution to precipitate; fifth, again decanting the supernatant liquid from the precipitate; and finally, causing or allowing the liquid to evaporate from the mass.

3. The process of obtaining lecithin from seeds of leguminous plants, which consists in boiling one cwt. of said seeds in 50 to 75 liters of alcohol and thereby producing a liquid extract, repeatedly concentrating the extract, causing or allowing a solution rich in lecithin to precipitate after each concentration, separating the supernatant solution from each precipitate, treating the precipitate with boiling alcohol and thereby separating the solution containing the lecithin from the fatty substance, and finally evaporating off the alcohol.

In testimony whereof I have signed my name to this specification in the presence of two subscribing witnesses.

HEINRICH CARL BUER.

Witnesses:
  LOIS VANDORY,
  M. KNEPPUS.